(12) United States Patent
Mori et al.

(10) Patent No.: US 8,451,387 B2
(45) Date of Patent: May 28, 2013

(54) DISPLAY

(75) Inventors: Eiichiro Mori, Daito (JP); Tadahiro Naito, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1390 days.

(21) Appl. No.: 12/043,364

(22) Filed: Mar. 6, 2008

(65) Prior Publication Data
US 2008/0218640 A1 Sep. 11, 2008

(30) Foreign Application Priority Data
Mar. 8, 2007 (JP) .................................. 2007-59256

(51) Int. Cl.
*H04N 5/50* (2006.01)
(52) U.S. Cl.
USPC .......................................... 348/731; 348/705
(58) Field of Classification Search
USPC .................................................. 348/731, 705
See application file for complete search history.

(56) References Cited

U.S. PATENT DOCUMENTS

| 6,278,645 B1 * | 8/2001 | Buckelew et al. ........ 365/230.01 |
| 2007/0146542 A1 * | 6/2007 | Strasser ......................... 348/462 |
| 2007/0283391 A1 * | 12/2007 | Connelly et al. ................. 725/44 |

FOREIGN PATENT DOCUMENTS

| JP | 62-132438 A | 6/1987 |
| JP | 8-56205 A | 2/1996 |
| JP | 2005-26769 A | 1/2005 |
| JP | 2005026769 | * 1/2005 |
| JP | 2006-332798 | * 12/2006 |
| JP | 2006-332798 A | 12/2006 |

OTHER PUBLICATIONS

Japanese Office Action dated May 12, 2009 with English translation (four (4) pages).
Japanese Office Action dated Jan. 6, 2009 with English translation (four (4) pages).

* cited by examiner

*Primary Examiner* — Chris Parry
*Assistant Examiner* — Sumaiya A Chowdhury
(74) *Attorney, Agent, or Firm* — Crowell & Moring LLP

(57) ABSTRACT

A display is formed such that a control portion reads second channel data corresponding to channels not displayed at start-up from a second storage portion after reading first channel data corresponding to a prescribed channel displayed on a display portion at the start-up from a first storage portion, at the start-up.

15 Claims, 3 Drawing Sheets

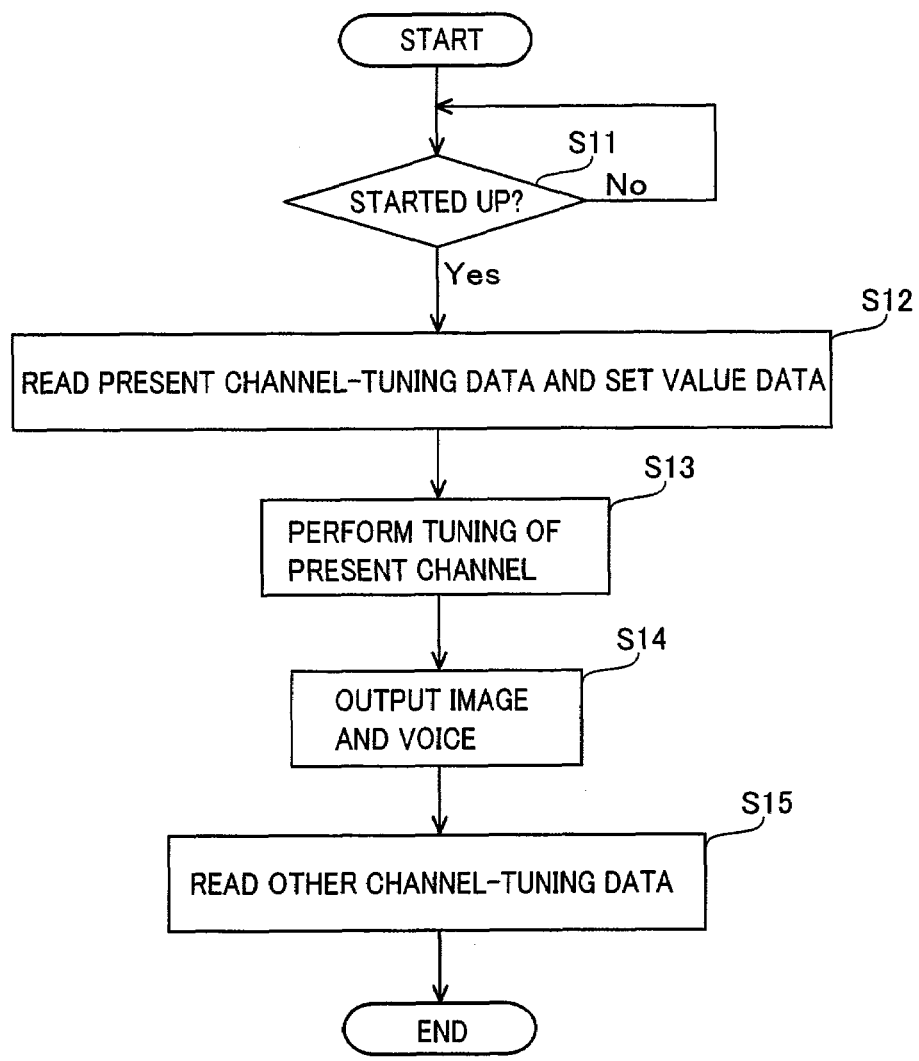

DISPLAY

BACKGROUND OF THE INVENTION

1. Field of the Invention

The present invention is relates to a display, and more particularly, it relates to a display comprising a storage portion storing channel data including information for receiving a television signal.

2. Description of the Background Art

A display comprising a storage portion storing channel data including information for receiving a television signal is known in general, as disclosed in Japanese patent Laying-Open No. 8-56205 (1996), for example.

The aforementioned Japanese patent Laying-Open No. 8-56205 discloses a display corresponding to a receiving system receiving image data and voice data, a multiplex digital broadcast signal of a plurality of program information such an identification number for identifying a prescribed program (subchannel) or respective identification numbers required for receiving prescribed image data and the voice data. The display described in Japanese patent Laying-Open No. 8-56205 comprises a program table memory (storage portion) storing a plurality of program information required for receiving a prescribed program. The program table memory can store the plurality of program information such as the identification number of the prescribed program or the identification numbers of the image data and the voice data and hence is not required to receive the identification number of the prescribed program, the identification numbers of the image data and the voice data or the like at start-up.

A conventional general display simultaneously reads all of channel data, set value information and the like from a prescribed storage portion at start-up and starts receiving a digital broadcast signal on the basis of frequency information including the read channel data, at the time of receiving the television signal. In this case, the channel data is data including frequency information of respective channels required for receiving the digital broadcast signal including the image data and the voice data and information for identifying receivable programs (subchannels) of the respective channels.

However, the aforementioned Japanese patent Laying-Open No. 8-56205 (1996) does not describe the details of an operation of reading channel data and set value data of monitor (display portion) from the prescribed storage portion at start-up and an operation from starting up till starting receiving the digital broadcast signal. Therefore, it is considered that the display described in the aforementioned Japanese patent Laying-Open No. 8-56205 simultaneously reads all of channel data, set value information and the like from a prescribed storage portion at start-up and starts receiving a digital broadcast signal on the basis of frequency information including the read channel data similarly to the conventional general display. Accordingly, the display described in the aforementioned Japanese patent Laying-Open No. 8-56205 is not required to receive the identification number of the prescribed program or the identification numbers of the image data and the voice data at start- up, while it cannot disadvantageously reduce a time from start-up till starting receiving the digital broadcast signal.

SUMMARY OF THE INVENTION

The present invention has been proposed in order to solve the aforementioned problem, and an object of the present invention is to provide a display capable of reducing a time till an image is displayed on a display portion by reducing a time from start-up till start of receiving a television signal.

A display according to a first aspect of the present invention comprises a display portion displaying an image based on a television signal, a first storage portion storing first channel data corresponding to a prescribed channel displayed on the display portion at start-up and including information for receiving the television signal, a second storage portion storing second channel data corresponding to channels not displayed on the display portion at the start-up and including information for receiving the television signal, and a control portion reading the first channel data and the second channel data from the first storage portion and the second storage portion respectively and controlling a whole display body, wherein the control portion is so formed as to read the second channel data from the second storage portion after reading the first channel data from the first storage portion at the start-up.

As hereinabove described, the display according to the first aspect is provided with the first storage portion storing the first channel data corresponding to the prescribed channel displayed on the display portion at start-up and including the information for receiving the television signal and the second storage portion storing the second channel data corresponding to the channel not displayed on the display portion at the start-up and including the information for receiving the television signal, and the control portion reading the first channel data and the second channel data from the first storage portion and the second storage portion respectively and controlling the whole display body, and the control portion is so formed as to read the second channel data from the second storage portion after reading the first channel data from the first storage portion at the start-up, whereby the control portion first read only the first channel data and hence can promptly start receiving the television signal of the prescribed channel corresponding to the first channel data. Thus, a time from start-up till start of receiving the television signal can be reduced, and hence a time till the image is displayed on the display portion can be reduced.

In the aforementioned display according to the first aspect, the first channel data in the first storage portion is preferably channel data of a channel finally displayed with the display portion. According to this structure, the control portion reads the channel data of the channel finally displayed with the display portion at start-up and hence the image of the channel finally displayed with the display portion can be displayed on the display portion at the start-up.

In this case, the control portion preferably stores the first channel data in the first storage portion when an operation of the display body is completed. According to this structure, the control portion automatically stores the first channel data in the first storage portion upon completion of the operation of the display body and hence a user may not instruct an operation for storing the first channel data in the first storage portion.

The aforementioned display according to the first aspect preferably further comprises a third storage portion temporarily storing the first channel data and the second channel data read from the first storage portion and the second storage portion with the control portion respectively, and a tuner portion performing tuning on the basis of the first channel data temporarily stored in the third storage portion at start-up, wherein the control portion is preferably so formed as to read the second channel data from the second storage portion after the tuner portion performs the tuning on the basis of the first channel data at start-up. According to this structure, the tuner portion performs the tuning on the basis of the first channel data before the control portion reads the second channel data from the second storage portion and hence a time till tuning is performed can be reduced.

In this case, the first storage portion and the second storage portion are preferably nonvolatile storage portions respectively, and the third storage portion is a volatile storage portion. According to this structure, the first channel data and the second channel data can be stored in the nonvolatile storage portions respectively when the display body is in a non-startup state, while the tuner portion can perform tuning on the basis of the first channel data and the second channel data stored in the volatile storage portion when the display body is in a startup state.

In the aforementioned structure comprising the tuner portion, the control portion is preferably so formed as to read the second channel data from the second storage portion in parallel with receipt of data for receiving image data of the prescribed channel displayed on the display portion after the tuner portion performs tuning on the basis of the first channel data in a case where the tuner portion receives channel data based on a digital television signal. According to this structure, the control portion promptly reads the second channel data from the second storage portion as compared with a case where the control portion reads the second channel data from the second storage portion after the tuner portion receives the data for receiving the image data of the prescribed channel displayed on the display portion and hence can promptly store the second channel data in the third storage portion.

In the aforementioned display according to the first aspect, the first storage portion and the second storage portion are preferably constituted by one memory. According to this structure, two memories may not be provided also in a case where the first channel data and the second channel data are separately stored, and hence increase in the number of the memories can be suppressed.

In the aforementioned display according to the first aspect, the first storage portion is preferably capable of storing channel data based on a digital television signal and channel data based on an analog television signal as the first channel data, and the second storage portion is preferably capable of storing channel data based on a digital television signal and channel data based on an analog television signal as the second channel data. According to this structure, the channel based on the digital television signal and the channel based on the analog television signal can be displayed on the display portion on the basis of the first channel data at the start-up, and the channel based on the digital television signal and the channel based on the analog television signal can be displayed on the display portion on the basis of the second channel data during the time other than the start-up.

The aforementioned display according to the first aspect preferably further comprises a fourth storage portion storing set value data of the display portion, wherein the first storage portion, the second storage portion and the fourth storage portion are preferably constituted by one memory. According to this structure, no memory for storing the set value data of the display portion may be separately provided, and hence increase in the number of the memories can be suppressed.

A display according to a second aspect of the present invention comprises a display portion displaying an image based on a television signal and a storage portion storing channel data including information for receiving the television signal, the storage portion includes a first storage portion storing first channel data corresponding to a prescribed channel displayed on the display portion at start-up and including information for receiving the television signal, a second storage portion storing second channel data corresponding to channels not displayed on the display portion at the start-up and including information for receiving the television signal, and a third storage portion temporarily storing the first channel data and the second channel data, and the display further comprises a control portion reading the first channel data and the second channel data from the first storage portion and the second storage portion respectively and controlling a whole display body and a tuner portion performing tuning on the basis of the first channel data temporarily stored in the third storage portion at the start-up. Additionally, the control portion is so formed as to read the second channel data from the second storage portion after reading the first channel data from the first storage portion at the start-up and read the second channel data from the second storage portion after the tuner portion performs the tuning on the basis of the first channel data. The first storage portion and the second storage portion are constituted by one memory, and the first channel data in the first storage portion is channel data of a channel finally displayed with the display portion.

As hereinabove described, the display according to the second aspect is provided with the first storage portion storing the first channel data corresponding to the prescribed channel displayed on the display portion at start-up and including the information for receiving the television signal and the second storage portion storing the second channel data corresponding to the channel not displayed on the display portion at the start-up and including the information for receiving the television signal, and the control portion reading the first channel data and the second channel data from the first storage portion and the second storage portion respectively and controlling the whole display body, and the control portion is so formed as to read the second channel data from the second storage portion after reading the first channel data from the first storage portion at the start-up, whereby the control portion first read only the first channel data and hence can promptly starts receiving the television signal of the prescribed channel corresponding to the first channel data. Thus, a time from start-up till start of receiving the television signal can be reduced, and hence a time till the image is displayed on the display portion can be reduced.

In the display according to the second aspect, the first channel data in the first storage portion is channel data of a channel finally displayed with the display portion, whereby the control portion reads the channel data of the channel finally displayed with the display portion at start-up and hence the image of the channel finally displayed on the display portion can be displayed on the display portion at the start-up. The aforementioned display according to the second aspect further comprises a third storage portion temporarily storing the first channel data and the second channel data read from the first storage portion and the second storage portion with the control portion respectively, and a tuner portion performing tuning on the basis of the first channel data temporarily stored in the third storage portion at start-up, wherein the control portion is so formed as to read the second channel data from the second storage portion after the tuner portion performs the tuning on the basis of the first channel data at start-up, whereby the tuner portion performs the tuning on the basis of the first channel data before the control portion reads the second channel data from the second storage portion and hence a time till tuning is performed can be reduced. The first storage portion and the second storage portion are constituted by one memory, whereby two memories may not be provided also in a case where the first channel data and the second channel data are separately stored, and hence increase in the number of the memories can be suppressed.

In the aforementioned display according to the second aspect, the control portion preferably stores the first channel data in the first storage portion when an operation of the display body is completed. According to this structure, the control portion automatically stores the first channel data in the first storage portion upon completion of the operation of the display body and hence a user may not instruct an operation for storing the first channel data in the first storage portion.

In the aforementioned display according to the second aspect, the first storage portion and the second storage portion are preferably nonvolatile storage portions respectively, and the third storage portion is preferably a volatile storage portion. According to this structure, the first channel data and the second channel data can be stored in the nonvolatile storage portions respectively when the display body is in a non-startup state, while the tuner portion can perform tuning on the basis of the first channel data and the second channel data stored in the volatile storage portion when the display body is in a startup state.

In the aforementioned display according to the second aspect, the control portion is preferably so formed as to read the second channel data from the second storage portion in parallel with receipt of data for receiving image data of the prescribed channel displayed on the display portion after the tuner portion performs tuning on the basis of the first channel data in a case where the tuner portion receives channel data based on a digital television signal. According to this structure, the control portion promptly reads the second channel data from the second storage portion as compared with a case where the control portion reads the second channel data from the second storage portion after the tuner portion receives the data for receiving the image data of the prescribed channel displayed on the display portion and hence can promptly store the second channel data in the third storage portion.

In the aforementioned display according to the second aspect, the first storage portion is preferably capable of storing channel data based on a digital television signal and channel data based on an analog television signal as the first channel data, and the second storage portion is preferably capable of storing channel data based on a digital television signal and channel data based on an analog television signal as the second channel data. According to this structure, the channel based on the digital television signal and the channel based on the analog television signal can be displayed on the display portion on the basis of the first channel data at the start-up, and the channel based on the digital television signal and the channel based on the analog television signal can be displayed on the display portion on the basis of the second channel data during the time other than the start-up.

The aforementioned display according to the second aspect preferably further comprises a fourth storage portion storing set value data of the display portion, wherein the first storage portion, the second storage portion and the fourth storage portion are preferably constituted by one memory. According to this structure, no memory for storing the set value data of the display portion may be separately provided, and hence increase in the number of the memories can be suppressed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flow chart for illustrating an operation performed when the television apparatus according to the embodiment of the present invention shown in FIG. 1 receives an analog television signal at start-up.

DESCRIPTION OF THE PREFERRED EMBODIMENTS

An Embodiment of the present invention will be hereinafter described with reference to the drawings.

A structure of the television apparatus according to the embodiment of the present invention will be now described with reference to FIG. 1. According to this embodiment, the present invention is applied to the television apparatus employed as an exemplary display.

Figure 1:
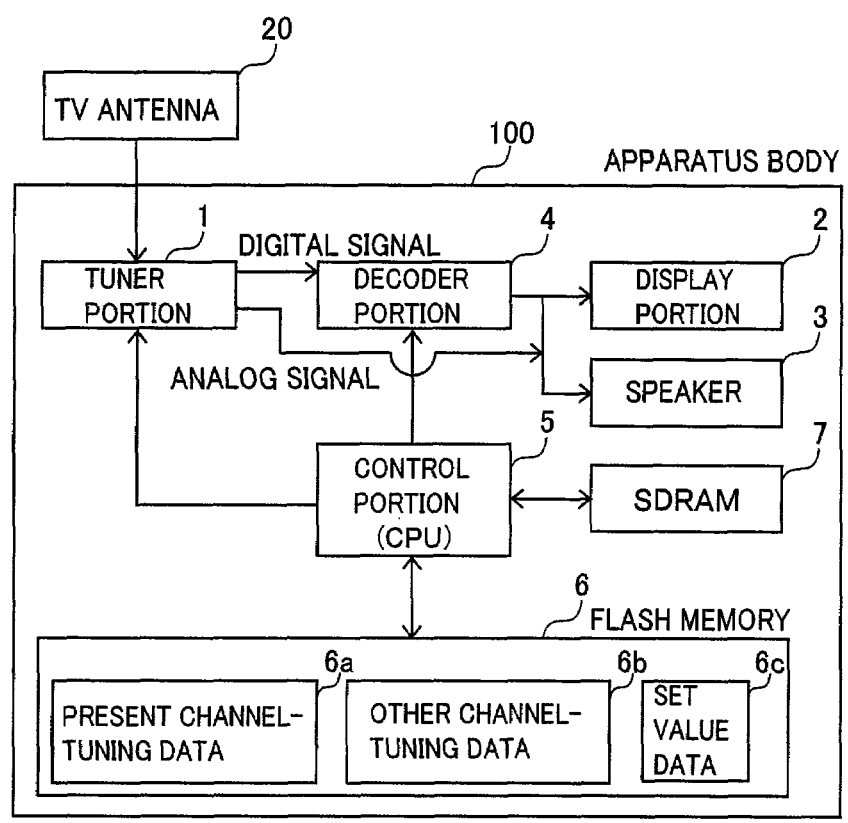
FIG. 1 is a block diagram for illustrating a structure of a television apparatus according to an embodiment of the present invention.

An apparatus body 100 of the television apparatus according to the embodiment of the present invention comprises a tuner portion 1 capable of receiving a digital television signal and an analog television signal through a TV antenna 20, a display portion 2 displaying an image on the basis of the received digital television signal and analog television signal with the tuner portion 1, a speaker 3 outputting a voice on the basis of the digital television signal and the analog television signal, a decoder portion 4 converting image data included in the digital television signal so as to be capable of displaying it on the display portion 2 and converting voice data included in the digital television signal so as to be capable of outputting it to the speaker 3, a control portion 5 controlling the whole apparatus body 100 as shown in FIG. 1.

The apparatus body 100 further comprises a nonvolatile flash memory 6 storing channel tuning data including information required for the tuner portion 1 to receive the digital television signal or the analog television signal and a volatile SDRAM (synchronous DRAM) 7 temporarily storing the channel tuning data during start-up of the apparatus body 100. The flash memory 6 has a storage area 6a storing present channel-tuning data corresponding to a prescribed channel displayed on the display portion 2 at the start-up of the apparatus body 100, a storage area 6b storing other channel-tuning data corresponding to channels not displayed on the display portion 2 at the start-up, and a storage area 6c storing set value data including information such as brightness or color displayed with the display portion 2 and volume outputted with the speaker 3. The storage area 6a, the storage area 6b and the storage area 6c of the flash memory 6 are examples of the "first storage portion", the "second storage portion", and the "fourth storage portion" in the present invention respectively, and the SDRAM 7 is an example of the "third storage portion" in the present invention. The present channel-tuning data is an example of the "first channel data" in the present invention, and the other channel-tuning data is an example of the "second channel data" in the present invention.

The present channel-tuning data is so formed as to be channel tuning data of a channel finally displayed with the display portion 2 when the operation of the apparatus body 100 is completed. More specifically, the present channel-tuning data is stored in the storage area 6a of the flash memory 6 with the control portion 5, when the operation of the apparatus body 100 is completed. The present channel-tuning data and the other channel-tuning data include frequency information corresponding to a prescribed channel and information of subchannels of the respective channels.

The tuner portion 1 is so formed as to perform tuning on the basis of the present channel-tuning data temporarily stored in the SDRAM 7 at the start-up of the apparatus body 100. The tuner portion 1 is so formed as to receive a PAT (program association table) included in a transport stream of a prescribed channel obtained from a prescribed frequency after performing tuning, in a case where the digital television signal is received. The tuner portion 1 is so formed as to receive a prescribed PMT (program map table) on the basis of a PID (Packet ID) of the prescribed PMT obtained from the received PAT. Additionally, the tuner portion 1 is so formed as to receive the PID of image data and voice data obtained from the received PMT and receive image data and voice data corresponding a prescribed subchannel included in the digital television signal. The transport stream is one of multiple signal formats and is capable of treating individual streams of image data, voice data and the like in a common signal system and transmitting the same as one stream. The PAT is a PID list of the PMT of all of the subchannels included in the prescribed channel, and the PMT is a PID list of the image data and the voice data of the prescribed subchannel. The PID is identification numbers for identifying the respective data, allocated to image data and voice data divided as a packet and transmitted.

According to this embodiment, the control portion 5 is so formed as to read the present channel-tuning data, the other channel-tuning data and the set value data from the flash memory 6 and temporarily stores the same in the SDRAM 7 respectively. Thus, the control portion 5 can read the present channel-tuning data, the other channel-tuning data and the set value data from the SDRAM 7 and hence a read operation can be promptly performed during the set-up. The control portion 5 is so formed as to read the other channel-tuning data after reading the present channel-tuning data from the flash memory 6 at the start-up of the apparatus body 100. More specifically, the control portion 5 first read only the present channel-tuning data from the flash memory 6 at the start-up of the apparatus body 100 and stores the same in the SDRAM 7. The control portion 5 is so formed as to read the other channel-tuning data from the flash memory 6 after the tuner portion 1 performs the tuning on the basis of this stored present channel-tuning data.

In the case where the digital television signal is received, the control portion 5 is so formed as to read the other channel-tuning data from the flash memory 6 in parallel with receiving operations of receiving the PAT, the PMT, the image data and the like and store the same in the SDRAM 7, after the tuner portion 1 performs the tuning on the basis of the present channel-tuning data. Thus, the operation of reading the other channel-tuning data can be performed simultaneously with the receiving operations of receiving the PAT, the PMT, the image data and the like, and hence the other channel-tuning data can be promptly stored in the SDRAM 7 as compared with a case where the other channel-tuning data is read from the flash memory 6 after the tuner portion 1 receives the PAT and the PMT.

In a case where the analog television signal is received, the control portion 5 is so formed as to display an image on the display portion 2 after the tuner portion 1 performs the tuning on the basis of the present channel-tuning data. Thereafter the control portion 5 is so formed as to read the other channel-tuning data from the flash memory 6 and store the same in the SDRAM 7.

An operation performed when the digital television signal is received at start-up of the television apparatus according to the embodiment of the present invention will be now described with reference to FIG. 2.

Figure 2:
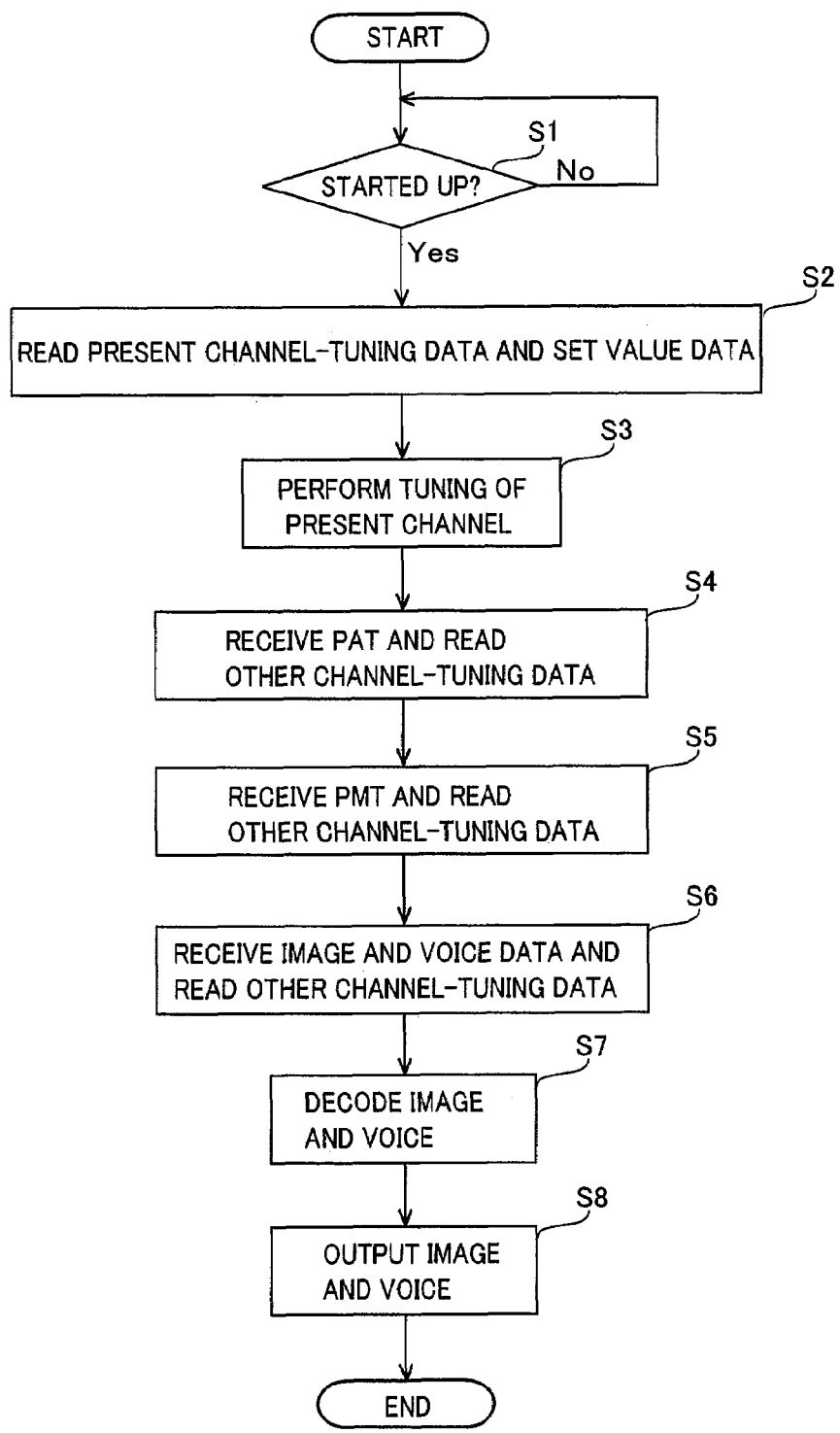
FIG. 2 is a flow chart for illustrating an operation performed when the television apparatus according to the embodiment of the present invention shown in FIG. 1 receives a digital television signal at start-up.

At a step S1 in FIG. 2, the control portion 5 determines whether or not the apparatus body 100 has started. If determining that the apparatus body 100 has not started, the control portion 5 repeats this determination. If determining that the apparatus body 100 has started, the control portion 5 reads the present channel-tuning data and the set value data from the flash memory 6 and stores the same in the SDRAM 7 respectively at a step S2. The tuner portion 1 performs the tuning on the basis of the present channel-tuning data stored in the SDRAM 7 at a step S3, and receives the PAT in a step S4. The tuner portion 1 receives the PMT on the basis of the received PAT at a step S5, and receives the image data and the voice data on the basis of the received PMT at a step S6. At the steps S4, S5 and S6, the control portion 5 reads the other channel-tuning data from the flash memory 6 in parallel with the aforementioned operations and stores the same in the SDRAM 7. As a step S7, the decoder portion 4 converts the image data so as to be capable of displaying the same on the display portion 2 and converts the voice data so as to be capable of outputting the same to the speaker 3. At a step S8, the image is displayed on the display portion 2 and the voice is outputted to the speaker 3, thereby completing the operation.

An operation performed when the analog television signal is received at start-up of the television apparatus according to the embodiment of the present invention will be now described with reference to FIG. 3.

At a step S11 in FIG. 3, the control portion 5 determines whether or not the apparatus body 100 has started. If determining that the apparatus body 100 has not started, the control portion 5 repeats this determination. If determining that the apparatus body 100 has started, the control portion 5 reads the present channel-tuning data and the set value data from the flash memory 6 and stores the same in the SDRAM 7 respectively at a step S12. At a step S13, the tuner portion 1 performs tuning on the basis of the present channel-tuning data stored in the SDRAM 7. At a step S14, the image is displayed on the display portion 2 and outputted to the voice to the speaker 3 on the basis of the analog television signal received by the tuner portion 1. Thereafter the control portion 5 reads the other channel-tuning data from the flash memory 6 and stores the same in the SDRAM 7 at a step S15, thereby completing the operation.

According to this embodiment, as hereinabove described, the television apparatus is provided with the flash memory 6 having the storage area 6a storing the present channel-tuning data corresponding to the prescribed channel displayed on the display portion 2 at start-up and including the information for receiving the digital television signal or the analog television signal and the storage area 6b storing the other channel-tuning data corresponding to the channel not displayed on the display portion at the start-up and including the information for receiving the digital television signal or the analog television signal, and the control portion 5 reading the present channel-tuning data and the other channel-tuning data from the flash memory 6 and controlling the whole apparatus body 100, and the control portion 5 is so formed as to read the other channel-tuning data after reading the present channel-tuning data from the flash memory 6 at the start-up, whereby the control portion 5 first read only the present channel-tuning data and hence can promptly starts receiving the digital television signal or the analog television signal of the prescribed channel corresponding to the present channel-tuning data. Thus, a time from start-up till start of receiving the digital television signal or the analog television signal can be reduced, and hence a time till the image is displayed on the display portion 2 can be reduced.

According to this embodiment, the present channel-tuning data of the flash memory 6 is the channel tuning data of the channel finally displayed with the display portion 2, whereby the control portion 5 reads the channel tuning data of the channel finally displayed with the display portion 2 at start-up and hence the image of the channel finally displayed with the display portion 2 can be displayed at the start-up.

According to this embodiment, the television apparatus is provided with the SDRAM 7 temporarily storing the present channel-tuning data and the other channel-tuning data read from the flash memory 6 with the control portion 5, and the tuner portion 1 performing the tuning on the basis of the present channel-tuning data temporarily stored in the SDRAM 7 at the start-up of the apparatus body 100, and the control portion 5 is so formed as to read the other channel-tuning data from the flash memory 6 after the tuner portion 1 performs the tuning on the basis of the present channel-tuning data at start-up, whereby the tuner portion 1 performs the tuning on the basis of the present channel-tuning data before the control portion 5 reads the other channel-tuning data from the flash memory 6 and hence a time till tuning is performed can be reduced.

According to this embodiment, the control portion 5 stores the present channel-tuning data in the storage area 6a of the flash memory 6 when the operation of the apparatus body 100 is completed, whereby the control portion 5 automatically stores the present channel-tuning data in the storage area 6a of the flash memory 6 upon completion of the operation of the apparatus body 100 and hence a user may not instruct an operation for storing the present channel-tuning data in the storage area 6a of the flash memory 6.

According to this embodiment, the control portion 5 is so formed as to read the other channel-tuning data from the storage area 6b of the flash memory 6 in parallel with the receiving operations of receiving the PAT or the PMT for receiving the image data of the prescribed channel displayed on the display portion 2 after performing the tuning on the basis of the present channel-tuning data, in a case where the tuner portion 1 receives the channel data based on the digital television signal, whereby the control portion 5 promptly reads the other channel-tuning data from the storage area 6b of the flash memory 6 as compared with a case where the control portion 5 reads the other channel-tuning data from the storage area 6b of the flash memory 6 after the tuner portion 1 receives the PAT or the PMT for receiving the image data of the prescribed channel displayed on the display portion 2 and hence can promptly store the other channel-tuning data in the SDRAM 7.

According to this embodiment, the one flash memory 6 is provided with the storage area 6a storing the present channel-tuning data, the storage area 6b storing the other channel-tuning data and the storage area 6b storing the set value data, whereby separate memories may not be provided and hence increase in the number of the memories can be suppressed.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment is applied to the television apparatus as an exemplary display, the present invention is not restricted to this but is also applicable to a display other than the television apparatus, so far as the display comprising a storage portion storing channel data including information for receiving a television signal.

While the present channel-tuning data is the channel tuning data of the channel finally displayed with the display portion 2 when the operation of the apparatus body 100 is completed in the aforementioned embodiment, the present invention is not restricted to this but the channel tuning data may alternatively be a channel of the smallest channel number, for example.

While the flash memory 6 is employed as examples of the first and second storage portions in the aforementioned embodiment, the present invention is not restricted to this but a memory other than the flash memory may alternatively be employed so far as the same is a nonvolatile memory.

While the SDRAM 7 is employed as an example of the third storage portion in the aforementioned embodiment, the present invention is not restricted to this but a memory other than the SDRAM may alternatively be employed so far as the same is a volatile memory.

While the present channel-tuning data and the other channel-tuning data are stored in the one flash memory 6 in the aforementioned embodiment, the present invention is not restricted to this but the present channel-tuning data and the other channel-tuning data may be stored in separate memories respectively.

What is claimed is:

1. A display comprising:
   a display portion displaying an image based on a television signal;
   a first storage portion storing first channel data corresponding to a prescribed channel displayed on said display portion at start-up and including information for receiving said television signal;
   a second storage portion storing second channel data corresponding to channels not displayed on said display portion at the start-up and including information for receiving said television signal; and
   a control portion reading said first channel data and said second channel data from said first storage portion and said second storage portion respectively and controlling a whole display body, wherein
   said control portion is so formed as to read both said first channel data and said second channel data at the start-up which is the time before said prescribed channel is displayed on said display portion, by reading said second channel data from said second storage portion at the start-up after reading said first channel data from said first storage portion at the start-up.

2. The display according to claim 1, wherein said first channel data is channel data of a channel finally displayed with said display portion.

3. The display according to claim 2, wherein said control portion stores said first channel data in said first storage portion when an operation of said display body is completed.

4. The display according to claim 1, further comprising:
   a third storage portion temporarily storing said first channel data and said second channel data read from said first storage portion and said second storage portion with said control portion respectively, and
   a tuner portion performing tuning on the basis of said first channel data temporarily stored in said third storage portion at start-up, wherein
   said control portion is so formed as to read said second channel data from said second storage portion after said tuner portion performs said tuning on the basis of said first channel data at start-up.

5. The display according to claim 4, wherein
   said first storage portion and said second storage portion are nonvolatile storage portions respectively, and said third storage portion is a volatile storage portion.

6. The display according to claim 4, wherein
said control portion is so formed as to read said second channel data from said second storage portion in parallel with receipt of data for receiving image data of said prescribed channel displayed on said display portion after said tuner portion performs tuning on the basis of said first channel data.

7. The display according to claim 1, wherein
said first storage portion and said second storage portion are constituted by one memory.

8. The display according to claim 1, wherein
said first storage portion is capable of storing channel data based on a digital television signal and channel data based on an analog television signal as said first channel data, and
said second storage portion is capable of storing channel data based on a digital television signal and channel data based on an analog television signal as said second channel data.

9. The display according to claim 1, further comprising a fourth storage portion storing set value data of said display portion, wherein
said first storage portion, said second storage portion and said fourth storage portion are constituted by one memory.

10. A display comprising:
a display portion displaying an image based on a television signal; and
a storage portion storing channel data including information for receiving said television signal,
said storage portion including a first storage portion storing first channel data corresponding to a prescribed channel displayed on said display portion at start-up and including information for receiving said television signal, a second storage portion storing second channel data corresponding to channels not displayed on said display portion at the start-up and including information for receiving said television signal, and a third storage portion temporarily storing said first channel data and said second channel data,
further comprising a control portion reading said first channel data and said second channel data from said first storage portion and said second storage portion respectively and controlling a whole display body, and
a tuner portion performing tuning on the basis of said first channel data temporarily stored in said third storage portion at the start-up, wherein
said control portion is so formed as to read both said first channel data and said second channel data at the start-up which is the time before said prescribed channel is displayed on said display portion, by reading said second channel data from said second storage portion at the start-up after reading said first channel data from said first storage portion at the start-up and read said second channel data from said second storage portion after said tuner portion performs said tuning on the basis of said first channel data,
said first storage portion and said second storage portion are constituted by one memory, and
said first channel data is channel data of a channel finally displayed with said display portion.

11. The display according to claim 10, wherein
said control portion stores said first channel data in said first storage portion when an operation of said display body is completed.

12. The display according to claim 10, wherein
said first storage portion and said second storage portion are nonvolatile storage portions respectively, and said third storage portion is a volatile storage portion.

13. The display according to claim 10, wherein
said control portion is so formed as to read said second channel data from said second storage portion in parallel with receipt of data for receiving image data of said prescribed channel displayed on said display portion after said tuner portion performs tuning on the basis of said first channel data 14. The display according to claim 10, wherein
said first storage portion is capable of storing channel data based on a digital television signal and channel data based on an analog television signal as said first channel data, and
said second storage portion is capable of storing channel data based on a digital television signal and channel data based on an analog television signal as said second channel data.

15. The display according to claim 10, further comprising a fourth storage portion storing set value data of said display portion, wherein
said first storage portion, said second storage portion and said fourth storage portion are constituted by one memory

* * * * *